United States Patent [19]
Glaeser et al.

[11] 3,830,370
[45] Aug. 20, 1974

[54] MOTION DECOUPLED SKIMMER FOR REMOVING OIL FROM THE SURFACE OF CALM OR DISTURBED WATER

[75] Inventors: John L. Glaeser; Wilson G. Weisert, Jr.; Gerald R. Cunningham, all of Santa Monica, Calif.

[73] Assignee: Esso Production Research Company, Houston, Tex.

[22] Filed: Sept. 5, 1972

[21] Appl. No.: 286,526

[52] U.S. Cl. .......................... 210/242, 210/DIG. 21
[51] Int. Cl. ............................................. E02b 15/04
[58] Field of Search ................ 210/83, 242, DIG. 21

[56] References Cited
UNITED STATES PATENTS

| | | | |
|---|---|---|---|
| 3,722,687 | 3/1973 | Stebbins et al. | 210/219 |
| 3,722,688 | 3/1973 | Wirsching | 210/242 |
| 3,722,689 | 3/1973 | Markel et al. | 210/242 |
| 3,726,406 | 4/1973 | Damberger | 210/242 |
| 3,727,765 | 4/1973 | Henning, Jr. | 210/242 |
| 3,730,346 | 5/1973 | Prewitt | 210/242 |

*Primary Examiner*—Theodore A. Granger
*Attorney, Agent, or Firm*—John S. Schneider

[57] ABSTRACT

A motion decoupled skimmer for removing oil from the surface of calm or disturbed water includes a floatable pumping assembly which contains a sump, flotation unit, pump and motor surrounded by or positioned within a floatable oil collection assembly which contains a weir, flotation unit and a closed flow passageway for conveying oil from the weir to the sump. The weir and its flotation unit are connected together in a fixed relationship (motion coupled). In order to maintain the oil collection assembly and pumping assembly properly spaced from each other, spacing means may be employed to connect the pumping assembly and the oil collection assembly. The oil collection assembly is light and responsive to wave motion.

4 Claims, 8 Drawing Figures

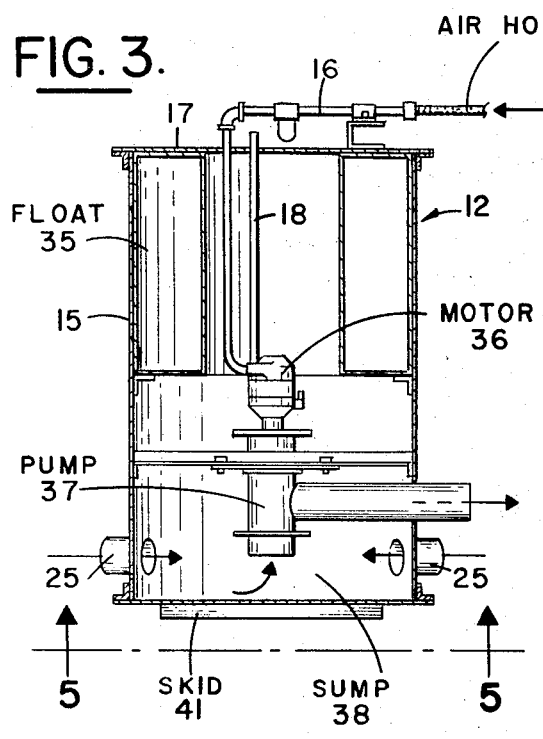
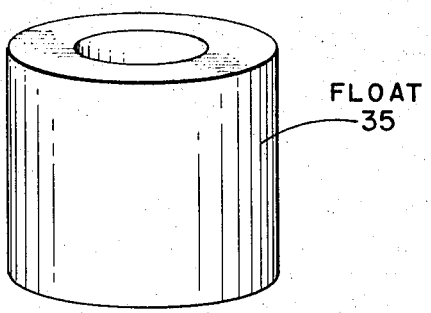
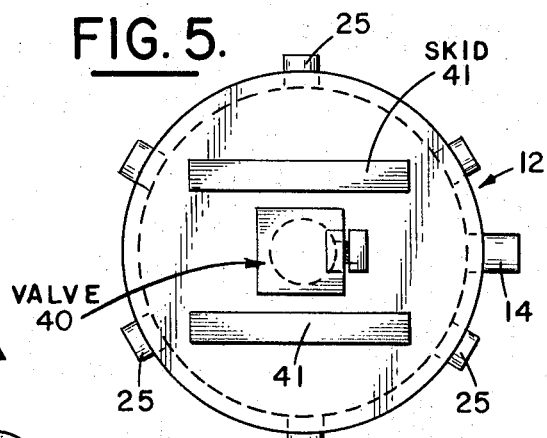
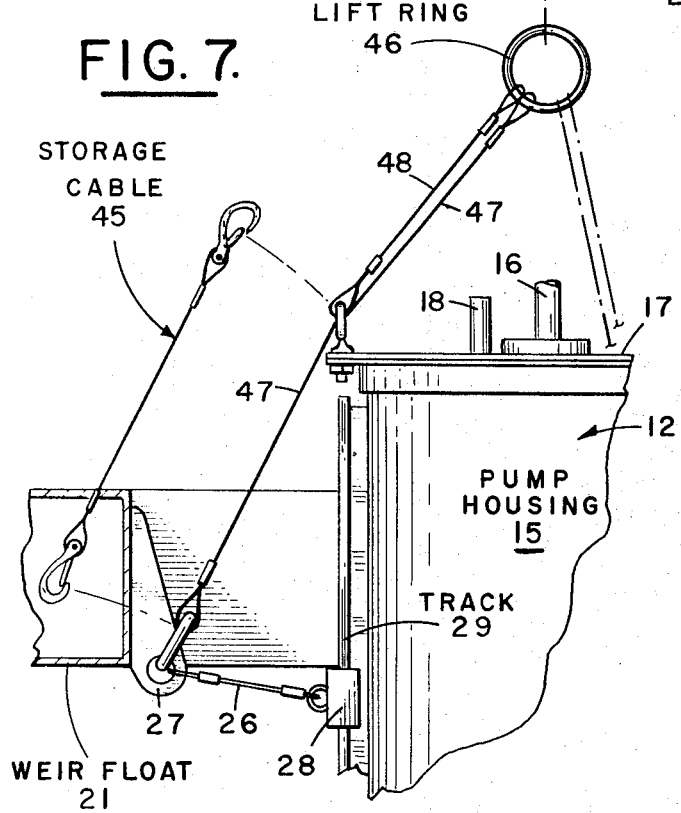
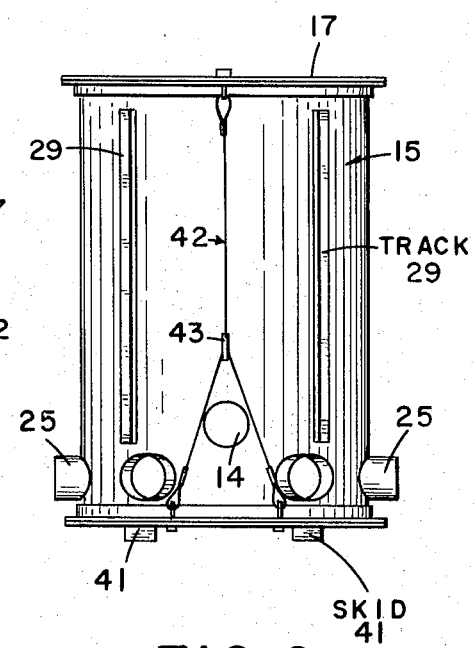

MOTION DECOUPLED SKIMMER FOR REMOVING OIL FROM THE SURFACE OF CALM OR DISTURBED WATER

BACKGROUND OF THE INVENTION

The present invention concerns a skimmer device for recovering oil in an open sea or calm water environment. It may be used alone or in conjunction with any of the existing containment barrier devices.

In order to provide effective protection against the effects of an oil spill on a body of water the oil must be recovered quickly and efficiently. Many weir type skimmers for recovering oil spilled in a body of water are now commercially available; however, all of them share one or more of the following disadvantages: inability to operate effectively in other than comparatively calm or sheltered waters; inability to recover oil at rates desired for a major oil spill; inability to be deployed quickly because of size, weight, or necessary auxiliary equipment; inability to be operated by untrained personnel; and inability to be quickly transported to distant sites.

The first disadvantage, the inability to work in the open sea, is the most common fault of existing weir type skimmers. Although skimmers are available which will physically withstand an open sea environment, almost all weir type skimmers become ineffective when operating in waves because of a severe drop in the oil-to-water recovery ratio. The increased water intake is due to the inability of the skimmers to conform closely to the changing sea surface, particularly for skimming devices using fixed weirs. For a skimmer ballasted low in the water, approaching waves raise the oil/water interface above the lip of the weir causing only water to flow into the skimmer until the skimmer finally responds to the wave or the receding wave lowers the oil/water interface back below the weir lip. On the other extreme, if the skimmer is ballasted high in the water, passing waves lower the air/oil interface below the lip of the weir causing the skimmer to pump air (surge) and as a result produce an insufficient flow rate. Both extremes are due to the inability of the skimmer weirs to respond effectively to the sea surface.

The second disadvantage, low oil recovery rates, is due in part to the problem of skimmer response to waves, but also to imposed design restrictions and/or design deficiencies. In any major oil spill a recovery or skimmer device must be able to provide high volume flow rates. The recovery device should be able to operate in both very thin and very thick oil slicks with the capability of adjusting its output to the amount of oil available to be recovered.

The last three disadvantages are concerned basically with size and complexity. Increasing size and complexity increases the problems related to storage, transport, deployment and operation of any skimmer.

SUMMARY OF THE INVENTION

A skimmer for removing oil from the surface of the water which includes a floatable pumping assembly containing a sump, a pump for pumping liquid from the sump, means for supporting the pumping assembly in the water and a motor for operating the pump; and an oil collection assembly containing weir means having an overflow lip and fixed to a flotation unit, and a flow passageway to transport liquid which overflows the weir lip to the sump. Spacing means may connect the pumping assembly and the oil collection assembly and maintain them spaced apart.

BRIEF DESCRIPTION OF THE DRAWINGS

FIG. 3 is a side view, partly in section, of the pumping assembly;

FIG. 4 is an isometric view of the float of the pumping assembly of FIG. 3;

FIG. 5 is a view taken along lines 5—5 of FIG. 3;

FIG. 6 is a side view of the pumping assembly with a towing bridle attached;

FIG. 7 is a side view of a portion of the pumping assembly and oil collection assembly showing the arrangement of the cables for lifting and for storage of the skimmer.

DESCRIPTION OF THE PREFERRED EMBODIMENTS

Figure 1:
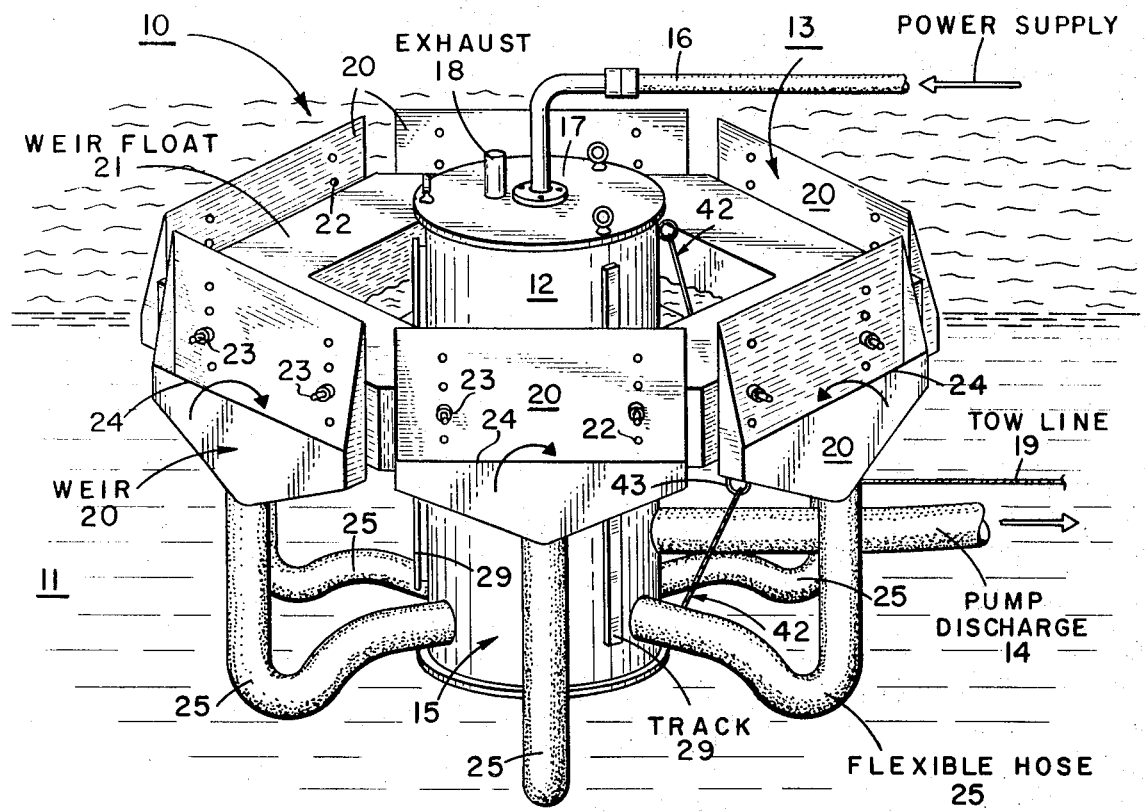
FIG. 1 is an isometric view of the oil skimmer of the present invention.

Referring to FIG. 1, a skimmer, generally designated 10, is shown arranged in a body of water 11. The skimmer includes an inner pumping assembly 12 surrounded by an oil collection assembly 13. A pump discharge conduit 14 projects from the lower portion of the pump assembly housing 15. A power supply conduit 16 extends through the top 17 of pump housing 15; and an air motor exhaust conduit 18 also extends through the top 17 of pump housing 15. A tow line 19 is connected to pump housing 15 by means of a towing bridle 42, as also shown in FIG. 6. The oil collection assembly includes a series of spaced apart weirs 20 mounted on a continuous weir float 21. Each weir has two sets of vertically aligned holes 22 through any two of which the weir is secured to the float by fasteners 23, as shown. These holes permit vertical adjustment of the weir and its lip 24 relative to float 21. A flexible drain hose 25 connects each weir 20 to a sump within pump housing 15.

Figure 2:
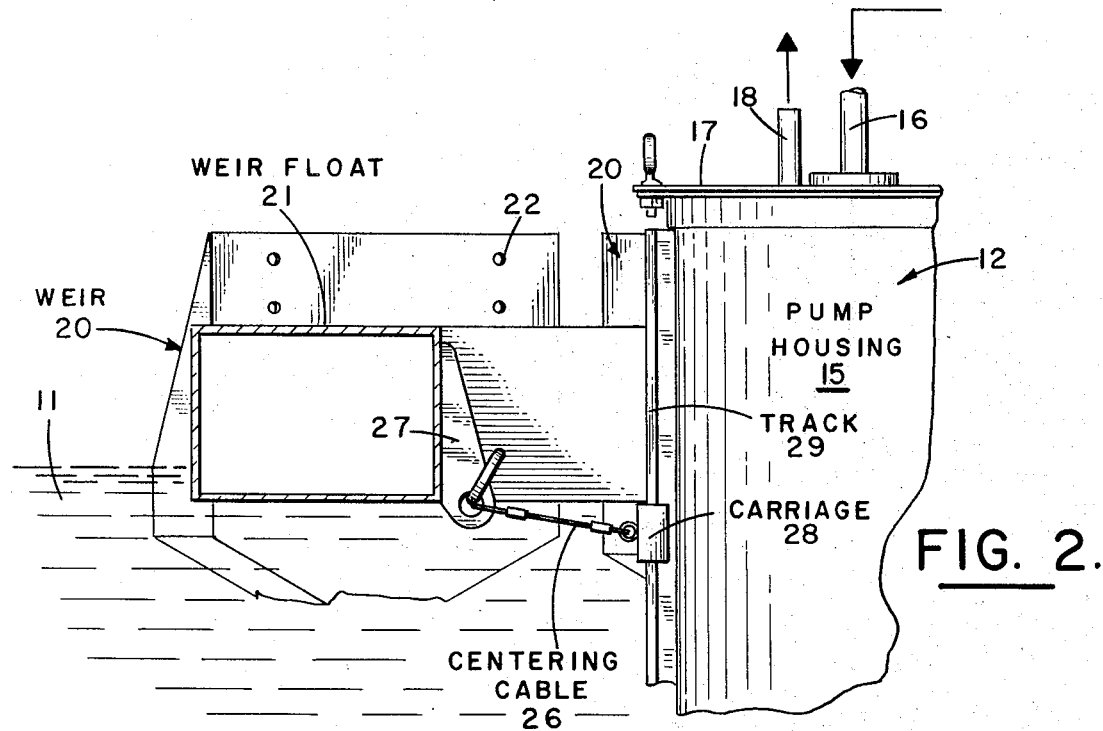
FIG. 2 is a side view, partly in section, showing the pumping assembly and oil collection assembly of the oil skimmer of FIG. 1.

As seen in FIG. 2, to maintain pumping assembly 12 centered within weir float 21 a number of centering cables are employed. Each centering cable 26 is connected at one end to a padeye 27 attached to weir float 21 and at the other end to a carriage 28 which is slidable along a track 29 mounted on pump housing 15. The tracks are equally spaced about the periphery of pump housing 15.

Pump housing 15, as shown in greater detail in FIGS. 3, 4 and 5, contains a cylindrically shaped float 35, an air motor 36 connected to a pump 37 positioned in a sump 38 (into which hoses 25 discharge). The bottom end of sump 38 contains a flapper valve 40, as seen in FIG. 5, to allow drainage of the sump 38, when skimmer 10 is removed from the water. Skids 41 are located on the bottom of pump housing 15.

Towing bridle 42 which connects to tow line 19 at 43 is shown in FIGS. 1 and 6. In FIG. 7 a storage cable 45 and a lift ring 46 to which lifting cables 47 and 48 are attached for removing the skimmer from the water are shown. A number of spaced apart storage cables are used and when connected maintain the pump assembly and oil collection assembly in proper relative positions when removed from the water.

Figure 8:
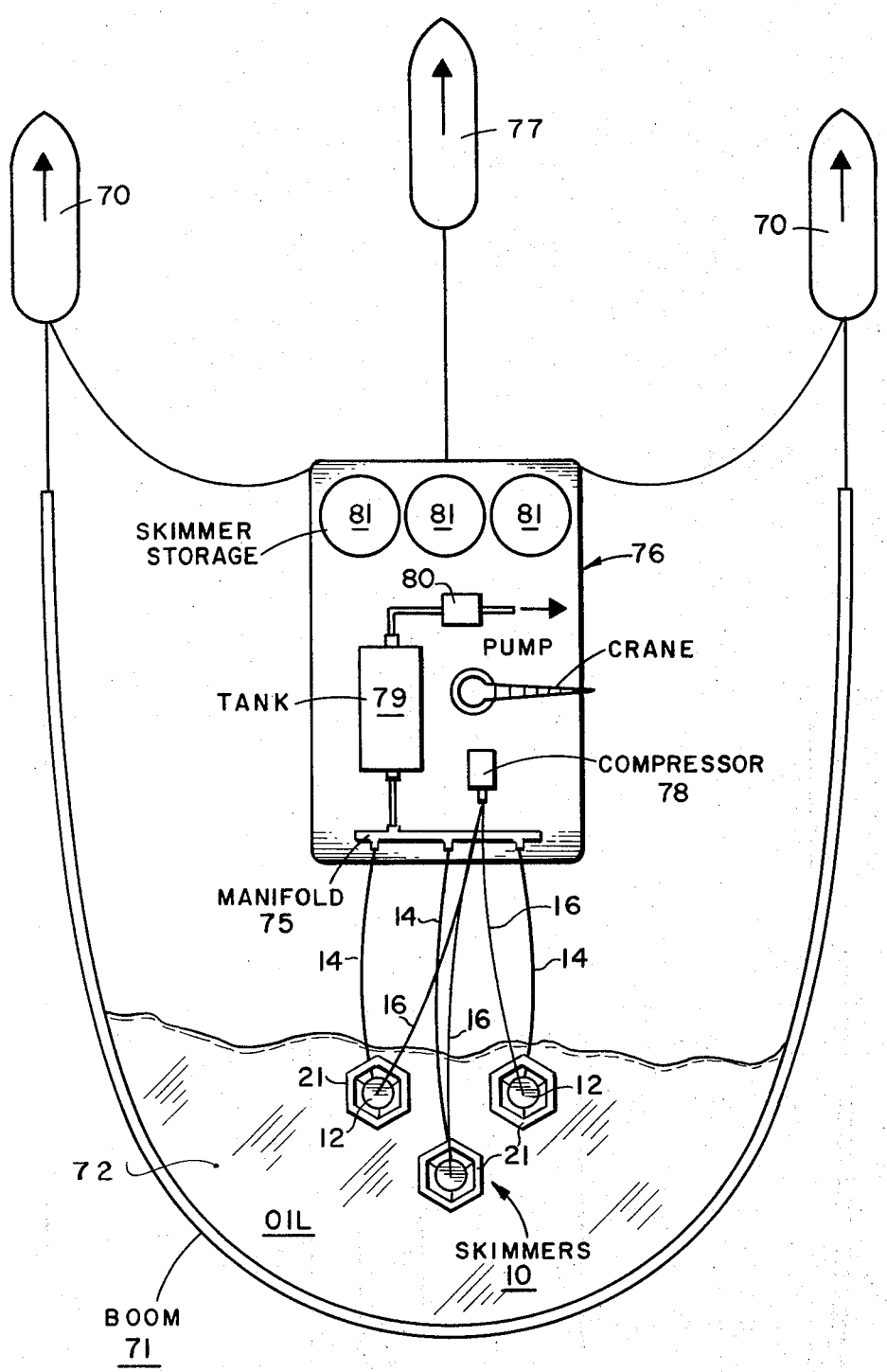
FIG. 8 illustrates a typical oil collecting operation in which the skimmers of the present invention are employed.

A typical operation in which the skimmer of the invention might be used is illustrated in FIG. 8. As shown in that figure tow boats 70 are towing each end of an oil containment boom 71. The oil indicated at 72 collected by boom 71 is being recovered by skimmers 10. Each skimmer has its pump discharge 14 connected to a manifold 75 located on a barge 76 being towed by a tugboat 77. Each skimmer 10 is connected to an air compressor 78 on barge 76. A settling tank 79 is connected to manifold 75 and to a pump 80 which may transfer the recovered oil to storage tanks on a shuttle barge, not shown. Compartments 81 are provided for storing the skimmers when they are not in use.

In the operation of the skimmer, pump 37 is operated by air supplied from air compressor 78 to motor 36 through power supply line 16. Air exhausts from motor 36 through exhaust pipe 18. Each weir 20 is adjusted to a desired, predetermined height relative to weir float 21 by attaching the weir to the float with fasteners 23 connected through the same level openings 22. The lip or edge 24 of each weir is adjusted so that as the weir float 21 rides on the waves a maximum amount of oil and a minimum amount of water overflows lip 24 into weir 20. The overflow liquid flows through flexible hoses 25 into sump 38 whence it is pumped by pump 37 driven by motor 36 through pump discharge line 14 and into manifold 75 as heretofore described. The heavier pump housing assembly 12 does not respond as quickly and has less movement than the oil collecting assembly 13. Centering cables 26 maintain pump housing 15 spaced from weir float 21. Carriages 28 slide on tracks 29 to compensate for the greater movement of float 21 and weirs 20 associated therewith.

Skimmer 10 has good wave conformance to maintain a high oil-to-water ratio and a sufficient pump capacity to be useful in a major spill. It is simple to operate and is reasonably small consistent with the other requirements to facilitate operating, handling, shipping and storage. The oil collection assembly 13 is decoupled dynamically from the pumping assembly 12. The dynamic uncoupling allows the relatively light oil collection assembly 13 to respond quickly to wave motion while still providing a pumping assembly capable of delivering high volume flow rates. It is important that the oil collection assembly have a high ratio of waterline area to weight so that the assembly can respond quickly to any change in the water surface contour. A portion of the weight of the skimmer, i.e., the pump and motor, can then be supported by the pumping assembly without having a detrimental effect on the motion responses of the oil collection assemblies. This system provides a large pumping capacity (with its resultant weight) but still allows the oil collection assembly to follow the oil/water interface thereby maintaining both a high recovery volume and a high oil-to-water ratio.

The hexagonal configuration of weir float 21 and the six separated weirs 20 are shown only for purposes of illustration. It is one of many possible configurations. Any geometric shape can be used for any of the components as long as the weirs are spaced from the pumping assembly and connected to the sump by suitable means that allows freedom of movement for the oil collection assembly relative to the pumping assembly in at least heave and roll and preferably in all directions and maintains an effective flow path. The dynamic uncoupling need not be accomplished with flexible hoses and cables such as illustrated. Any means allowing relative movement in the required direction may be used. For example, the oil collection assembly may be spaced from the pumping assembly with a rigid linkage having slip joints with travel stops and rotating end connections. In place of a flexible hose, a rigid conduit having a slip joint and rotating end connections may be used.

The weirs 20 need not be separated and spaced around the weir float 21 but may be joined together to form one continuous weir. The weir float 21 need not be continuous but may be broken into segments provided each segment is spaced from the pumping assembly by a means allowing relative movement in the required directions and has an attached weir with a flow path to the pumping assembly.

The pump may be powered by a motor connected to a separate prime mover or may be connected directly to a prime mover in the sump.

Changes and modifications may be made in the illustrative embodiments of the invention shown and/or described herein without departing from the scope of the invention as defined in the appended claims.

Having fully described the apparatus, method of operation, advantages and objects of our invention we claim:

1. A skimmer for removing oil from the surface of water comprising:
   a pumping assembly including sump means for the collection of liquid, a flotation means for supporting said pumping assembly in said water, and pump means for pumping liquid from said sump means; and
   an oil collection means including a plurality of weir means each having a liquid overflow lip and each being spaced from and arranged circumferentially about said pumping assembly, other flotation means spaced from and formed as a continuous ring about said pumping assembly and fixed to each of said weir means for floatingly supporting said weir means on the surface of said water, means for permitting vertical adjustment of said weir means relative to said other flotation means, flexible means connecting a lower portion of the interior of each of said weir means to said sump means for conveying said liquid from each of said weir means to said sump means, and centering means flexibly connecting said other flotation means and said pumping assembly for independent movement of said other flotation means relative to said pumping assembly.

2. A skimmer as recited in claim 1 in which said flexible means for conveying said liquid from each of said weir means to said sump means comprises a flexible hose.

3. A skimmer as recited in claim 2 wherein said centering means comprises a plurality of spaced apart linkages.

4. A skimmer as recited in claim 3 including a plurality of vertically arranged tracks mounted on said pumping assembly; a carriage slidable along each track, each carriage being connected to one end of one of said linkages, the other end of each linkage being connected to said other float.

* * * * *